C. ROBINSON.
DEHYDRATER.
APPLICATION FILED AUG. 16, 1912.

1,204,070.

Patented Nov. 7, 1916.
5 SHEETS—SHEET 1.

Fig. 1.

Witnesses
Marshall Low
S. Jay Teller

Inventor
Cyrus Robinson
By H. & Bliss
Attorney

C. ROBINSON.
DEHYDRATER.
APPLICATION FILED AUG. 16, 1912.

1,204,070.

Patented Nov. 7, 1916.
5 SHEETS—SHEET 3.

Fig. 3.

Witnesses
Marshall Low
S. Jay Teller

Inventor
Cyrus Robinson
By H. St. Blix
Attorney

UNITED STATES PATENT OFFICE.

CYRUS ROBINSON, OF MOUNT VERNON, NEW YORK, ASSIGNOR TO METALLURGICAL ENGINEERING & PROCESS CORPORATION, A CORPORATION OF NEW YORK.

DEHYDRATER.

1,204,070.   Specification of Letters Patent.   Patented Nov. 7, 1916.

Application filed August 16, 1912. Serial No. 715,516.

*To all whom it may concern:*

Be it known that I, CYRUS ROBINSON, a subject of the King of Great Britain, residing at Mount Vernon, in the county of Westchester and State of New York, have invented certain new and useful Improvements in Dehydraters, of which the following is a specification, reference being had therein to the accompanying drawings.

This invention relates to improvements in filtering or dehydrating machines of the type especially adapted for use in separating the moisture from ore pulp during the processes of extracting the metallic values from ore by means of solvent such as potassium cyanid.

The invention relates more particularly to that class of machines in which a rotating drum or equivalent structure is used for supporting a filtering medium and in which the filtering medium is subjected to suction and preferably also to air pressure.

The principal object of my present invention is to provide an improved device for feeding ore pulp to the rotating drum, a machine embodying my improvements being especially adapted for the handling of pulp containing quantities of very coarse material and also quantities of very fine material. With earlier machines it has been customary to provide a large tank into which the pulp to be treated is fed and to move filtering elements through the pulp, thus withdrawing the moisture and causing the solid matter to accumulate in layers or cakes on the filtering medium. But when the pulp contains quantities of relatively coarse material, there is a decided tendency for this coarse material to settle to the bottom of the tank and there accumulate.

By my present invention I have provided means for feeding the fresh pulp directly to the filtering drum at a point near the top so that there is an immediate filtering action which causes all of the solid matter to adhere to the filtering medium. After the cake or layer of solid material has been formed on the surface of the drum it may be moved by the continued rotation of the drum into and through a body of fresh water or weak solution which is drawn through it by suction. After passing through the wash water or weak solution the solid matter is removed from the drum.

In addition to providing means for feeding pulp to the drum near the top thereof, one of the objects of my invention is to provide a feeding mechanism having numerous improved structural features and adapted to feed the pulp regularly and positively and to evenly distribute it over the surface of the drum.

A further object is to provide an improved means for removing the solid matter from the drum after the completion of dehydration and washing.

Further objects will be apparent from the following specification and claims.

In the drawings I have shown my improvements in connection with a mechanism similar to that described in my co-pending application for dehydraters, Serial No. 594,704, filed November 29, 1910.

Referring to the drawings, 1 represents as a whole a vat or tank within which the dehydrating drum is mounted. The lower part of the tank may advantageously be constructed of concrete as indicated in the drawings and the upper part may advantageously be formed of sheet metal 3 reinforced at the top with an angle iron 4. The tank is shown cylindrical in form though it will be understood that this particular shape is not essential.

5 represents as a whole a hollow shaft which extends horizontally through the center of the upper part of the tank 1. The shaft is mounted in bearings 6, 6, which may, if desired, be arranged to engage with it only at the lower side as indicated in the drawings. Stuffing boxes 7, 7 are provided to prevent leakage of the solution or pulp at the points where the shaft extends through the tank walls. A suitable mechanism is provided for rotating the shaft and the parts attached to it, which will be fully described hereinafter. This rotating mechanism for the shaft may conveniently be a worm wheel 8 and a worm 9 mounted upon a shaft 10 which is operatively connected to any desired source of power. The shaft 5 is preferably made in three sections, the end sections 11, 11 being necessarily hollow and the central section 12 being also preferably hollow to reduce the weight. Each of the tubular end shaft sections is preferably tapered toward its outer end. The inner end is provided with an enlargement or hub 13 having its periphery composed of a number of small flat faces 13ª, 13ª, nine such faces being shown in the drawing. A circular aperture 14 is provided in each of the faces near its center, the aperture communicating with the hollow interior of the hub. Small radial ribs 15, 15 are provided, one between each two adjacent apertures.

The inner end of each of the sections 11, 11 is closed by a wall 16. The flanged central section 12 is secured to the end sections preferably by means of bolts as indicated. At the outer ends of the hollow end sections 11, 11 are stationary pipes 17, 18. Stuffing boxes 19, 19 are used to insure proper communication of the pipes with the interiors of the shaft sections without leakage. One of the pipes, as for instance 17, is connected to a suitable device for producing a partial vacuum, and the other pipe, as for instance 18, is connected to a suitable device for supplying air or other gas under pressure. The purposes of these suction and air supply pipes will be later fully set forth.

A number of hollow spokes 20, 20 are provided. In the drawings nine such spokes are indicated as connected with each of the hollow hubs 13, the inner end of each spoke being fastened to one of the faces 13ª of the hub, with the passage through the spoke in register with the corresponding aperture 14. These spokes may advantageously be formed of sections of piping to the ends of which are secured flanges of standard form. At the outer ends of the spokes of each set there is secured an annular, tubular ring or combined conduit and frame 21. This is preferably formed of cast iron in sections 22, 22, as many sections being provided as there are spokes. The ends of the adjacent sections may be provided with flanges through which pass bolts for connecting the sections together. Each section is provided with a hollow flanged boss 23, which is connected with the outer end of a spoke and which serves to establish communication between the interior of the spoke and the interior of the section. It will be noted that the sections connect with each other and thus free and uninterrupted communication is provided not only between all parts of the conduit or frame 21, but also, through the spokes 20, between the conduit and the interior of the corresponding shaft section 11. Each of the conduit or frame sections 22 is provided with a number of radially inward projecting bosses 24, 24. In the drawings five such bosses are shown for each section. As the constructions of all of these bosses and of the parts connected therewith are similar, a detail description of one of them will be sufficient.

Figure 5:
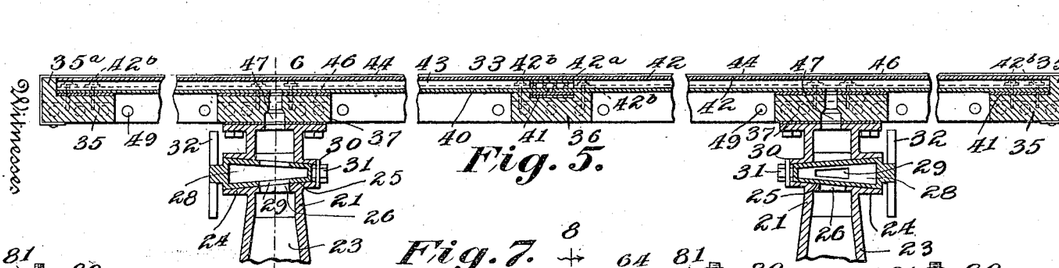
Fig. 5 is a fragmentary longitudinal sectional view taken along the line 5—5 of Fig. 4.
Figures 6, 7, 8, 9:
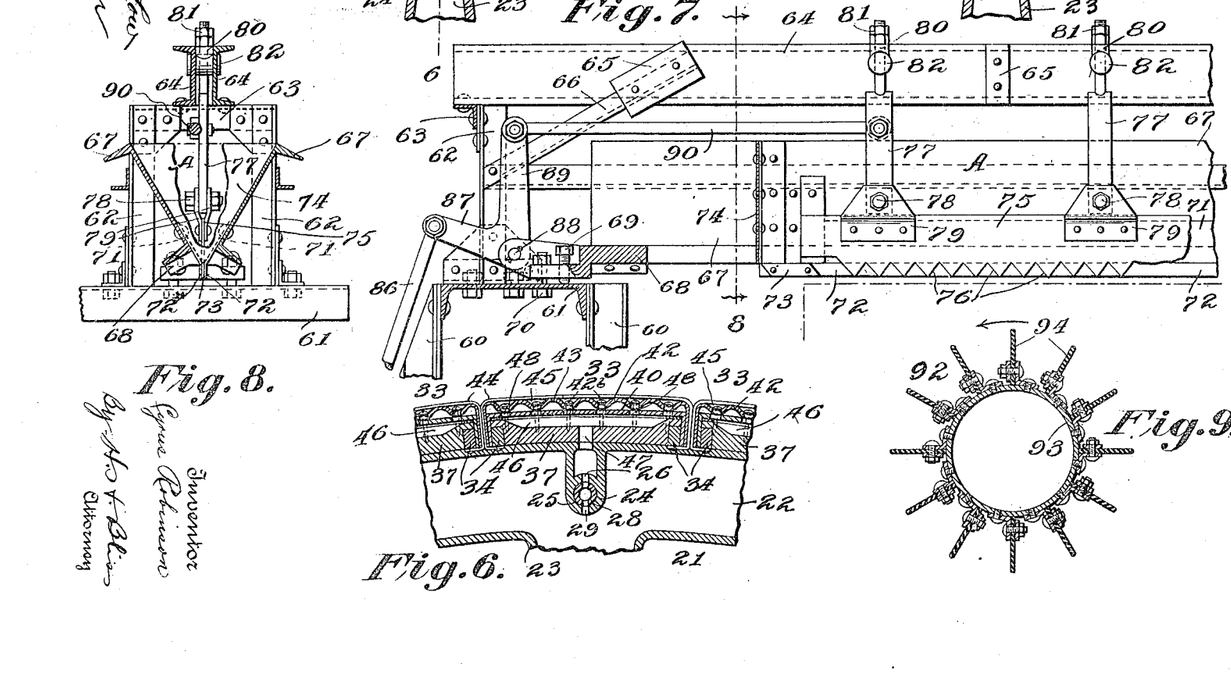
Fig. 6 is a fragmentary cross-sectional view taken along the line 6—6 of Fig. 5.
Fig. 7 is a fragmentary longitudinal section of one end of the feeding mechanism.
Fig. 8 is a transverse sectional view taken along the line 8—8 of Fig. 7.
Fig. 9 is an enlarged cross-sectional view taken through the scrubbing roller.

Referring more particularly to Figs. 5 and 6, it will be observed that a tapering aperture 25 is provided which extends transversely of the conduit section through the boss 24. Passageways 26 are provided through each boss to the aperture 25, one of these passageways communicating with the interior of the conduit and the other with the exterior at the periphery. Rotatably mounted within the aperture 25 is a correspondingly tapered valve plug or spigot 28, having a diametrical passage 29. The spigot may be held in place by a washer 30 and a nut 31, engaging its threaded end. The other end of the spigot is provided with a star wheel 32 having four arms. The purpose and function of the star wheel will be hereinafter fully set forth. 33 represents as a whole one of the filtering sections or pans which are secured to the frames 21, 21, and which, taken together, form a continuous drum or cylinder. As many of these sections are provided as there are bosses 24 and spigots 28, in this case there being forty-five sections in all. As these filtering sections or pans are of similar construction, a particular description of one of them will be sufficient. Each filter section has a framework preferably formed of wood and comprising two or more longitudinal side bars 34, 34 and cross bars 35, 36 and 37, the bars 37 being located to engage the frames or conduits 21, 21. The end cross bars 35, are provided with outstanding flanges 35ª, 35ª.

The framework which has been described is covered between the flanges 35ª, 35ª with a rolled metal sheet 40, which may for the sake of convenience be made in two parts connected by a butt strap 41, as shown in Fig. 5. The edges of the sheet 40 are bent inward to engage the edges of the bars 34 and the cross blocks. Outside of the sheet 40 is a second sheet of metal 42 which is given a series of longitudinal corrugations 43, 43 and which is also bent inward to contact with the inward bent edges of the sheet 40. The sheet 42 may also be in two parts connected by a butt strap 42ª. The sheets 40 and 42 may be secured in place by means of screws 42ᵇ, at the bottoms of the corrugations, and which extend into the blocks. If desired their inward bent edges may be riveted together.

44 represents a sheet of canvas which is stretched over the corrugations 43 and the edges of which are carried downward and inward and secured by nails or tacks to the bottoms of the bars 34, 34. It will be observed that by means of this construction the canvas is supported along a series of separated parallel lines. In this way there are formed beneath the canvas and between the adjacent corrugations longitudinal passageways 45, 45 which extend the entire length of the drum. Each of the cross blocks 37, 37 is provided with a groove 46, which extends transversely of the filter pan or section. An opening 47 establishes communication between the groove and the opening 27 leading from or to one of the spigots 28. Apertures 48, 48 are provided in the metal sheets 40 and 42 at the bottoms of the corrugations and establish communication between the groove 46 and the grooves or passageways 45, 45. In this way, therefore, unbroken communication is established when the spigots are open, between the conduit 21 and the grooves or passageways 45, 45. When all of the filter pans or sections are in place on the framework they may be secured together by means of bolts 49, 49, extending transversely through each pair of adjacent bars 34, 34.

Suitably mounted preferably upon the top of the sheet metal part of the tank are four parallel horizontal I-beams 51, 51 and 52, 52, two being mounted at one end of the drum, and two at the other end. Mounted upon the I-beams 51 and 52 at each end of the drum are other preferably smaller I-beams 53 which project inward within the drum outline. Secured to the ends of the beams 53 at each end of the drum are channel bars 54, and these are connected by means of vertical channel bars 55, 55 with bars or beams 56, 56 which project horizontally from the concrete tank wall. Mounted on the bars 54, 55 are brackets 57 and 58 each having a curved slot concentric with the axis of the drum. In the slot of each bracket there is adjustably mounted a pin 59 which is adapted to engage the star wheels 32 of the valves as the drum is rotated to turn them and open or close the valves as the case may be. It will be noted that by moving the pin to different positions in the slot the point of opening or closing the valves may be changed.

As shown in the drawings, I preferably provide two brackets 57 located at opposite sides of the drum just below the cleaning roller, and three brackets 58, two located at the upper part of the drum on opposite sides and one located on the vacuum side in advance of the brackets 57 and at about the level of the drum axis. As each filter section approaches the pins 59 of the brackets 58 at the upper part of the drum, it is connected with the pressure means but not with the suction means. The pins 59 turn the star wheels 33 to cut off the pressure and connect the vacuum. Each filter section remains in connection with the vacuum until its valve is closed by the pin 59 secured either to the lower bracket 58 or one of the higher brackets 57. This pin for the suction side of the machine may be located in either bracket, as desired. The pin 59 in the bracket 57 at the pressure side of the machine serves to operate the valve at that side and to successively connect the filter sections with the pressure device. It will thus be seen that as the sections pass the scrubbing roller they are disconnected from the vacuum and pressure is being applied which serves to aid the removal of material. When the sections again pass the pins at the upper part of the drum the pressure is again cut off and the vacuum is again connected.

Figure 1:
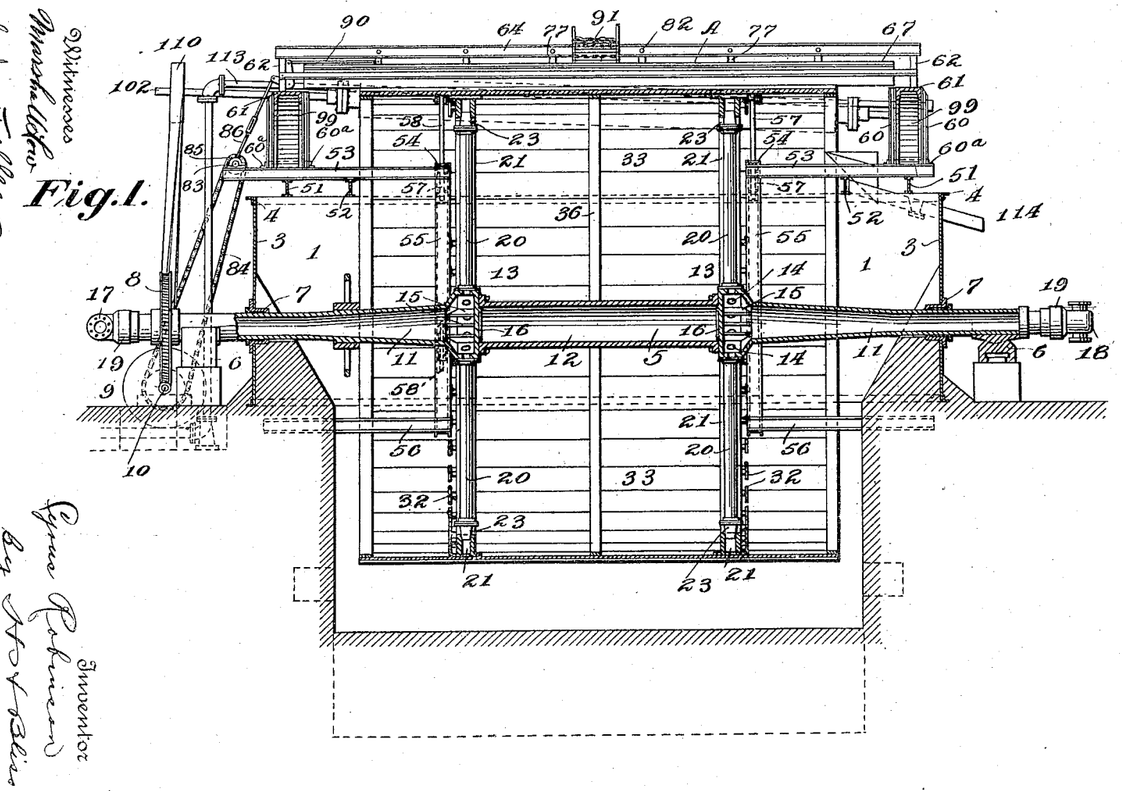
Figure 1 is a longitudinal sectional elevation taken along the line 1—1 of Fig. 2.
Figures 2, 10, 11:
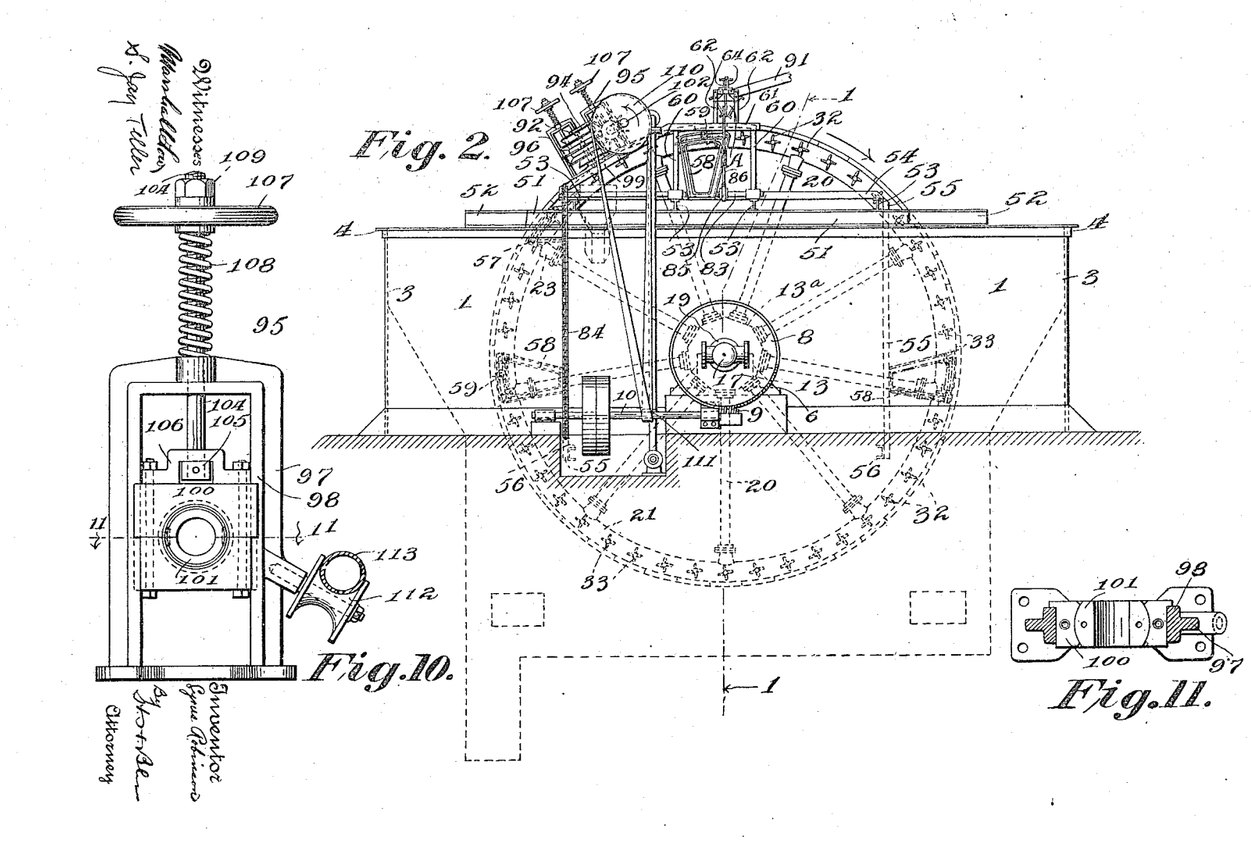
Fig. 2 is a view showing one end of the machine.
Fig. 10 is a detail view of one of the bearings and bearing brackets for the scrubbing roller.
Fig. 11 is a detail sectional view taken along the line 11—11 of Fig. 10.

Instead of following the mode of operation which has been outlined, it is frequently desirable to arrange for the conduction to a separate receptacle of the weak solution drawn through the material from the tank. When this is desired, two separate suction devices are provided and these are connected respectively with the pipes 17 and 18. The lower bracket 58 is removed from the position shown in Fig. 2, as is also one of the brackets 58 at the upper part of the drum (as for instance the one at the far side). These two brackets are put in position at the descending side of the drum as indicated by dot-and-dash lines in Fig. 2. It being understood that but one pin 59 is provided in the brackets 57 (preferably in the one at the far side) it will be seen that this pin will serve to close the valves at that side of the machine and thus leave the filter sections entirely without vacuum connections as they pass the scrubbing roller. As the sections pass the pin 59 at the upper part of the drum, the valves at the near side will be opened and the relatively strong solvent solution in the pulp deposited on the drum will be drawn out through the pipe 17. As the filter sections descend the connections are reversed at about the point where they enter the weak solution in the tank and the weak solution drawn through the pulp from the tank will pass out through the pipe 18 at the opposite end of the drum. After emerging from the weak solution the filter sections are again cut off from all vacuum connection in the manner which has been described.

At each end of the drum there is provided a suitable upstanding framework 60, this preferably comprising an inverted channel beam 61. Upon each channel beam 61 are two parallel uprights 62, 62, each pair of uprights being connected by cross bars 63. Mounted upon the two cross bars are channel beams 64, 64, which are placed back to back with a narrow space between. Filler block 65 may be provided at suitable intervals for connecting the beams together. If desired diagonal braces 66 may be provided between the beams 64, 64 and the uprights 62, 62. Preferably the channel bars 64, 64 are mounted directly above the center of the drum.

Mounted below the channel beams 64, 64 is a horizontal trough A which is V-shaped in cross section, and which is formed in part by two channel beams 67, 67 placed at an acute angle to each other. The lower flanges of these beams 67, 67 are bolted or riveted at their ends to supports or connectors 68, of which but one is shown in the drawings. Each connector is provided with two adjustable through tap bolts 69, the lower ends of which engage the upper surface of the corresponding channel beam 61. By means of these bolts 69, 69 the bracket 68 and the trough as a whole can be angularly adjusted either transversely or longitudinally as desired. Other bolts 70 are provided between the channel beams 61 and the brackets 68 for locking the brackets in place after they have been adjusted by means of the bolts 69.

71, 71 are sheet metal strips extending longitudinally of the channel beams 67, 67. These strips are secured to the channel beams by means of suitable rivets which preferably pass through the channel beam webs. The lower edge parts of the straps are bent so as to lie parallel and to be slightly separated, as indicated in Fig. 8. These parallel lower edge parts are connected at their ends by means of filler blocks 73 of which one is shown in the drawings. Near each end of the trough formed by the channel beams 67, 67 and the plates 71, 71 are end partitions 74, of which one is indicated in Figs. 7 and 8.

75 is a feed saw which comprises a long sheet metal strip provided with closely adjacent triangular notches 76, 76 in its lower edge. This saw is mounted with its lower toothed part in the space between the lower parallel edge parts 72, 72 of the plates 71, 71, the notches being to such depth that when the saw is in normal position they do not extend upward into the open space of the trough. The saw is supported by means of links 77, 77 which are pivotally connected at their lower ends to the saw by means of pins 78, 78 which extend through bracket plates 79, 79 riveted to the saw. The upper ends of the links 77 extend through suitable apertures in carriers 80, 80 and are threaded and provided with nuts 81, 81. The carriers 80 are pivotally mounted by means of trunnions 82, 82 which are mounted in suitable apertures in the webs in the channel beams 64, 64. It will be noted that by the construction which I have described the saw 75 can be vertically adjusted by means of the nuts 81. It will also be observed that the links 77 in addition to supporting the saw and holding it horizontally permit a longitudinal swinging movement which incidentally raises the saw slightly.

A swinging movement is given to the saw by means of the following mechanism: 83 is a shaft mounted in suitable bearings on the beams 63. This shaft is driven from the main shaft 10 by means of a chain 84 which passes over sprocket wheels on the shaft. Mounted on the shaft is an eccentric 85 which engages with an eccentric rod 86, this rod being adjustable in length. The upper end of the rod 86 is pivotally connected with one arm 87 of a bell crank having a pivot at 88 on the frame structure which supports the trough. The other arm 89 of the bell crank has pivotally connected with it one end of a link 90, the other end of which is pivotally connected to one of the links 77 which supports a saw. It will be seen that by means of this mechanism an oscillating movement is given to the saw 75 whenever the eccentric 85 on the shaft 83 is rotated.

The pulp to be treated is fed into the trough A through a pipe or chute 91 and through the trough is fed to the filter drum in a manner to be hereinafter described in detail.

92 represents as a whole a squeegee scrubbing roller for cleaning the surface of the drum after the filtering and dehydrating action has taken place. This roller is preferably mounted at the upper part of the drum near the feed trough A. The roller comprises an inner hollow core 93 to which is secured a number of radial squeegee plates 94 preferably formed of rubber. The roller is supported by end bearings 95, 96. One of these bearings is shown in detail in Fig. 10.

Figure 3:
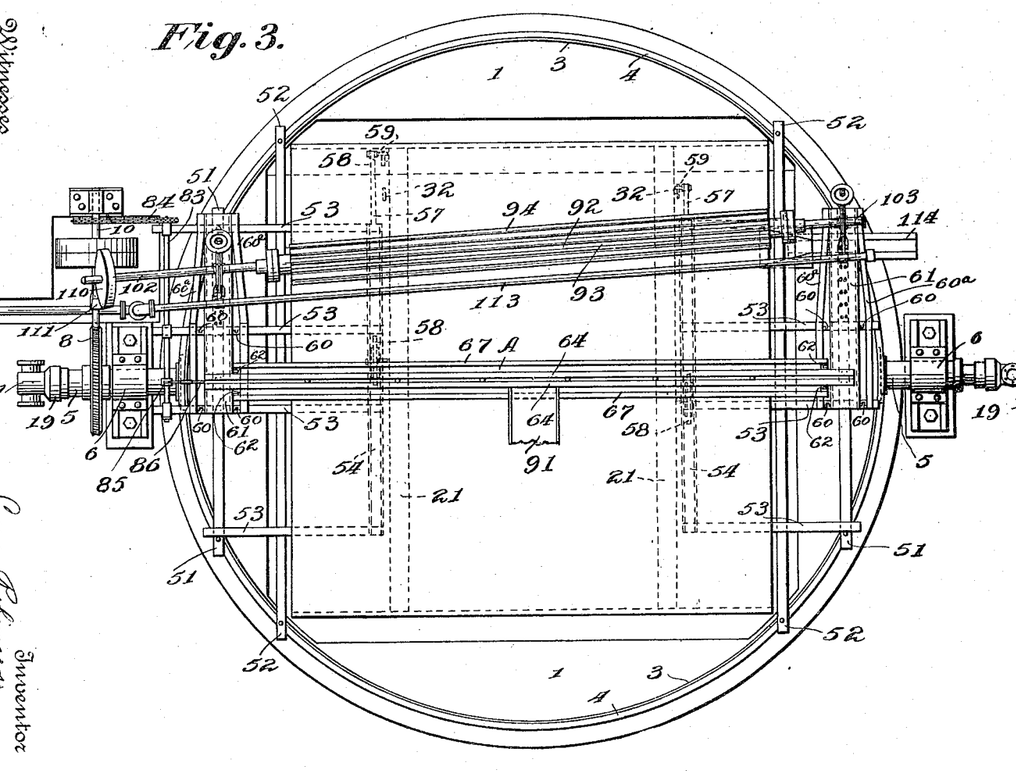
Fig. 3 is a plan view.
Figure 4:
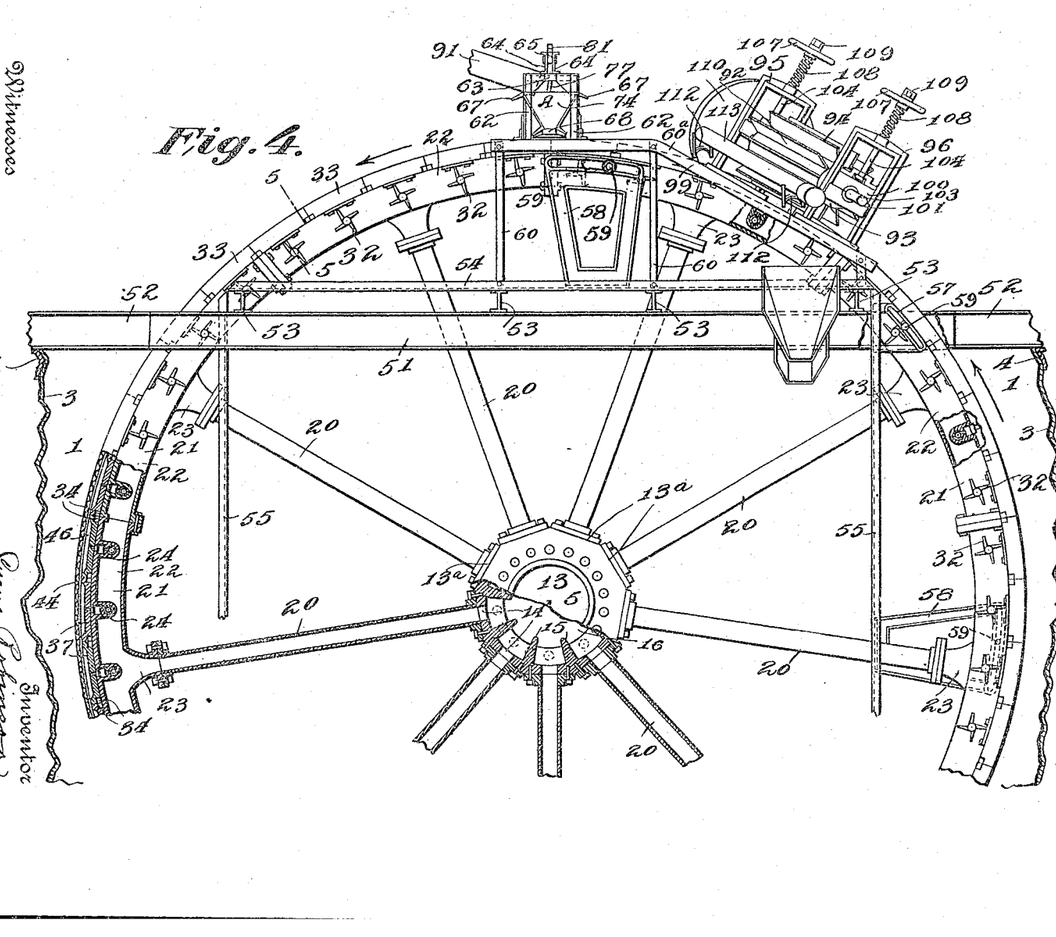
Fig. 4 is an enlarged fragmentary view partly in section showing the end of the machine opposite to that shown in Fig. 2.

97 is a bracket provided with parallel guides 98. The bracket is bolted to the inclined part 99 of the channel beam 61. The web of the channel is either longitudinally slotted or is provided with a series of holes as indicated in Fig. 3, so that the bracket as a whole can be adjusted along lines substantially tangential to the periphery of the drum. Mounted between the guides 98 is a block 100 formed in two parts which are bolted together. Between these parts there is mounted an inner bearing block 101 which is also formed in two parts. The connection between the block 100 and the block 101 is a ball and socket one, the two blocks being thus relatively adjustable. The stud shafts 102 and 103 at the ends of the roller 92 are mounted in the bearing blocks 101, the bearings being positioned to hold the roller at an angle to the axis of the drum, as indicated in Fig. 3.

Extending through a suitable aperture in the upper part of the bracket 98 is a threaded rod 104. This rod carries at its lower end a collar 105 which is held against movement with respect to the block 100 by means of a cap 106. On the upper threaded end of the rod 104 is a hand wheel 107 and interposed between the hand wheel and the upper part of the bracket is a spring 108. A lock nut 109 is preferably provided for securing the hand wheel 107 in adjusted position.

It will be noted that by means of the construction described the bearings for the roller shafts can be adjusted toward or away from the drum, and can be yieldingly held in adjusted position. It will also be noted that the bearing blocks 101 are automatically adjustable in the blocks 100 so that free regular adjustment of the blocks 100 is permitted and so that free tangential adjustment of the bearing supports as a whole is permitted. On the shaft 102 there is provided a belt pulley 110, and a drive belt passes over this pulley and a pulley 111 on the shaft 10. On each of the brackets 97 there is preferably provided a grooved roller 112 which is mounted for rotation about a horizontal axis. Resting upon the two rollers 112 is a pipe 113 which is connected with a suitable source from which a washing liquid, preferably fresh water, can be supplied. It will be noted that the rollers permit the brackets to be adjusted tangentially of the drum without causing any distortion of the pipe, and at the same time hold the pipe in its fixed relationship to the roller.

The pipe is provided with a series of apertures through which the wash water can be discharged downward onto the drum at points closely adjacent the roller. The material loosened from the drum by the roller is mixed with the water discharged from the pipe 113 and on account of the inclination of the roller is gradually worked to one side of the drum from which it is discharged into the trough or launder 114 by means of which it can be conveyed away from the machine for further treatment if desired.

In operation material to be treated which, as stated, may be a mixture of finely divided ore particles and a solvent solution containing dissolved values, is delivered to the trough A through the pipe or chute 91 and from the trough is fed by the saw 75 to the upper surface of the drum. By means of the screws or bolts 69, 69, the trough can be inclined slightly to insure a flow of material from one end to the other. The saw is swung backward and forward in the manner described by the eccentric 85 and the several connecting elements. This movement of the saw serves to agitate the material in the trough and to insure its even distribution along the length of the trough. At the end of each oscillation of the saw it is sufficiently raised to permit minute sub-masses of material to be treated to flow out of the trough into the space between the saw teeth. Then, as the saw moves backward toward its central position the material thus discharged from the trough is positively forced downward and ultimately reaches the drum surface. By means of the nuts 81 at the upper ends of the links 77 the saw as a whole can be inclined to correspond with the inclination of the trough. And by means of these same nuts the saw can be raised or lowered slightly to change the rate of feed, this obviously depending upon the elevation of the points of the saw notches at the ends of the oscillations. After being deposited upon the drum surface, the material is subjected to a powerful suction dehydrating action, the valves 28 at the suction side of the machine being open and those at the pressure side being closed. The liquid constituent of the mixture is drawn inward through the canvas and through the various passageways of the drum and ultimately out through the suction pipe 17. The solid matter remains on the surface of the drum and forms a relatively solid cake. In the lower part of the tank 1 there is maintained a body of wash liquid which may be either fresh water or a weak solvent solution. By the continued movement of the drum the cake or layer of solid material on its surface is moved into and through this wash liquid. The suction action being continued, a quantity of the wash liquid is drawn inward through the layer of solid material on the drum surface and serves to thoroughly wash it and remove therefrom any of the initial value-containing solution which was not returned by the first dehydrating action. The wash liquid in the tank can be maintained at whatever level is necessary to give the required washing action. After the cake or layer of material on the drum surface has emerged from the liquid, the valves 28 at the suction side of the machine are closed thus cutting off the suction and the valves 28 at the pressure side are opened thus permitting air under pressure to be admitted below the filtering medium. This air flows out through the medium and tends to loosen the material from it. As the layer of material moves upward it is engaged by the squeegee roller 92 the under side of which is moving in the same direction as the upper surface of the drum but at a greater speed. This roller serves to positively engage the material and to loosen it from the drum surface. The pipe 113 discharges wash water along the whole length of the drum at points just above the roller. This wash water mixes with the material loosened by the roller and forms a sludge which, because of the inclination of the roller and of the pipe, is gradually worked along toward one end of the drum from which it is discharged into the trough or launder 114 by means of which it can be carried off. It will be noted that the rate of movement of the material longitudinally of the drum can be regulated by changing the angle of the roller and pipe. The roller is resiliently held and can be adjusted toward or from the drum as the squeegee plates wear away.

It will be noted that by the construction which I have described there is no opportunity for the coarse material of the pulp to separate from the fine material and there is positive assurance that all of the material will become attached to the drum surface and be properly washed.

What I claim is:

1. In a dehydrating and washing mechanism for treating ore, the combination of a tank for wash liquid, an endless filtering medium moving through a path a portion of which is in the tank and a portion of which is outside of the tank and substantially horizontal, a pulp holder for sustaining a supply of ore pulp immediately over the horizontal part of said path, means positively engaging with the pulp in said holder for moving it transversely across and distributing it uniformly over said part of said path and means for removing the pulp adhering to the filtering medium after it emerges from the tank.

2. In a dehydrating and washing mechanism, the combination of a tank for a wash liquid, a rotatable filtering drum mounted to rotate while partially submerged in said tank, means above the upper part of said drum for supplying pulp fluid thereto, means engaging with the pulp immediately before it is delivered to the drum and positively moving it transversely thereof to uniformly distribute it, and means adjacent to and relatively behind the ore supplying devices for removing from the surface of the drum the material adhering thereto after it emerges from the tank.

3. In a dehydrating and washing mechanism for treating ores, the combination of a tank for wash liquid, a filtering drum arranged to rotate while partially submerged in the tank, a receptacle for holding ore pulp immediately above the drum and having devices for feeding the pulp across the surface of the filter, means for adjusting the feeding devices to change the rate of feeding, means positively engaging with the pulp to distribute it uniformly across the drum, and a cleaning device for removing material from the surface of the filter after it has emerged from the wash tank.

4. In a dehydrating and washing mechanism for treating ore, the combination of a tank for wash liquid, a filtering drum arranged to rotate while partially submerged in the tank, a horizontal feed trough above the filtering drum and extending across its upper surface, means for supplying ore pulp to said trough, means engaging with the said pulp while in said trough and reciprocating transversely to the path of the drum for positively feeding the pulp to the drum, manually controllable means for adjusting the feeding device to change the rate of feeding, and a device for removing material from the surface of the drum after it emerges from the tank.

5. In a dehydrating and washing mechanism for treating ore, the combination of a tank for wash liquid, a filtering drum arranged to rotate while partially submerged in the tank, a horizontal feed trough above and extending across the drum and having a narrow longitudinal slot in its bottom, means for supplying ore pulp to the trough, a toothed saw-like feeding device movably mounted in the said slot, and power devices for moving the feeding device vertically and horizontally to force material outward from the trough to the filtering medium.

6. In a dehydrating and washing mechanism, the combination of a tank adapted to contain wash liquid, an endless filtering medium, a movable support for the filtering medium arranged to carry it along an endless path which is at one point substantially horizontal and which at other points extends through the tank below the level of the wash liquid contained therein, a substantially horizontal feed trough above the filtering medium and extending entirely across it at the said substantially horizontal part of its path, the feed trough having a narrow longitudinal slot throughout the length of its bottom, means for supplying ore pulp or other similar material to the trough, a saw movably mounted in the said slot and provided with a series of notches in its lower edge, a power actuated mechanism for moving the said saw to bring the upper parts of the said notches alternately above and below the bottom of the trough whereby material is forced downward from the trough through the slot onto the filtering medium, manually controllable means for adjusting the said power actuated mechanism to regulate the extent of the movement of the upper parts of the said notches away from the trough bottom, and a device for removing material from the surface of the filtering medium at points beyond the part of the path which extends through the wash liquid.

7. In a dehydrating and washing mechanism, the combination of a tank adapted to contain wash liquid, an endless filtering medium, a movable support for the filtering medium arranged to carry it along an endless path which is at one point substantially horizontal and which at other points extends through the tank below the level of the wash liquid contained therein, a substantially horizontal feed trough above the filtering medium and extending entirely across it at the said substantially horizontal part of its path, the feed trough having a narrow longitudinal slot throughout the length of its bottom, means for supplying ore pulp or other similar material to the trough, means for adjusting the feed trough to elevate one end with respect to the other and thereby cause the material in the trough to move along it, a saw movably mounted in the said slot and provided with a series of notches in its lower edge, a power actuated mechanism for moving the said saw to bring the upper parts of the said notches alternately above and below the bottom of the trough whereby material is forced downward from the trough through the slot onto the filtering medium, means for adjusting the saw to bring it into parallelism with the feed trough, and a device for removing material from the surface of the filtering medium at points beyond the part of the path which extends through the wash liquid.

8. In a dehydrating and washing mechanism, the combination of a tank adapted to contain wash liquid, an endless filtering medium, a movable support for the filtering medium arranged to carry it along an endless path which is at one point substantially horizontal and which at other points extends through the tank below the level of the wash liquid contained therein, a substantially horizontal feed trough above the filtering medium and extending entirely across it at the said substantially horizontal part of its path, the feed trough having a narrow longitudinal slot throughout the length of its bottom, means for supplying ore pulp or other similar material to the trough, means for adjusting the feed trough to elevate one end with respect to the other, and thereby cause the material in the trough to move along it, a saw movably mounted in the said slot and provided with a series of notches in its lower edge, a power actuated mechanism for moving the said saw to bring the upper parts of the said notches alternately above and below the bottom of the trough whereby material is forced downward from the trough through the slot onto the filtering medium, manually controllable means for adjusting the power actuated mechanism to regulate the extent of the movement of the upper parts of the said notches away from the trough bottom, means for adjusting the saw to bring it into parallelism with the feed trough, and a device for removing material from the surface of the filtering medium at points beyond the part of the path which extends through the wash liquid.

9. In a dehydrating and washing mechanism, the combination of a tank adapted to contain wash liquid, an endless filtering medium, a movable support for the filtering medium arranged to carry it along an endless path which is at one point substantially horizontal and which at other points extends through the tank below the level of the wash liquid contained therein, a substantially horizontal feed trough above the filtering medium and extending entirely across it at the said substantially horizontal part of its path, the feed trough having a narrow longitudinal slot throughout the length of its bottom, means for supplying ore pulp or other similar material to the trough, a saw movably mounted in the said slot and provided with a series of notches in its lower edge, a series of normally vertical links pivotally connected at their lower ends to the saw, a support to which the links are pivotally connected at their upper ends, a power actuated mechanism for oscillating the links to move the saw forward and backward and bring the upper parts of the said notches alternately above and below the bottom of the trough whereby material is forced downward from the trough through the slot onto the filtering medium, and a device for removing material from the surface of the filtering medium at points beyond the part of the path which extends through the wash liquid.

10. In a dehydrating and washing mechanism, the combination of a tank adapted to contain wash liquid, an endless filtering medium, a movable support for the filtering medium arranged to carry it along an endless path which is at one point substantially horizontal and which at other points extends through the tank below the level of the wash liquid contained therein, a substantially horizontal feed trough above the filtering medium and extending entirely across it at the said substantially horizontal part of its path, the feed trough having a narrow longitudinal slot throughout the length of its bottom, means for supplying ore pulp or other similar material to the trough, a saw movably mounted in the said slot and provided with a series of notches in its lower edge, a power actuated mechanism for moving the said saw to bring the upper parts of the said notches alternately above and below the bottom of the trough whereby material is forced downward from the trough through the slot onto the filtering medium, means for adjusting the saw with respect to the trough to bring it into or out of parallelism with respect thereto, and a device for removing material from the surface of the filtering medium at points beyond the part of the path which extends through the wash liquid.

11. In a dehydrating and washing mechanism, the combination of a tank adapted to contain wash liquid, an endless filtering medium, a movable support for the filtering medium arranged to carry it along an endless path which is at one point substantially horizontal and which at other points extends through the tank below the level of the wash liquid contained therein, a substantially horizontal feed trough above the filtering medium and extending entirely across it at the said substantially horizontal part of its path, mechanism for successively opening and closing a series of openings in the bottom of the trough and extending from end to end thereof, means for supplying ore pulp or other similar material to the trough, and a device for removing material from the surface of the filtering medium at points beyond the part of the path which extends through the wash liquid.

12. In a dehydrating and washing mechanism, the combination of a tank adapted to contain wash liquid, an endless filtering medium, a movable support for the filtering medium arranged to carry it along an endless path which is at one point substantially horizontal and which at other points extends through the tank below the level of the wash liquid contained therein, a substantially horizontal feed trough above the filtering medium and extending entirely across it at the said substantially horizontal part of its path, mechanism for successively opening and closing a series of openings in the bottom of the trough and extending from end to end thereof, means for regulating the said opening and closing mechanism to vary the maximum size of the openings, means for supplying ore pulp or similar material to the trough, and a device for removing material from the surface of the filtering medium at points beyond the part of the path which extends through the wash liquid.

13. In a dehydrating and washing mechanism, the combination of a tank adapted to contain wash liquid, an endless filtering medium, a movable support for the filtering medium arranged to carry it along an endless path which is at one point substantially horizontal and which at other points extends through the tank below the level of the wash liquid contained therein, a substantially horizontal feed trough above the filtering medium and extending entirely across it at the said substantially horizontal part of its path, mechanism for successively opening and closing a series of openings in the bottom of the trough and extending from end to end thereof, and for positively forcing material from the trough out through the said openings, means for supplying ore pulp or other similar material to the trough, and a device for removing material from the surface of the filtering medium at points beyond the part of the path which extends through the wash liquid.

14. In a dehydrating and washing mechanism, the combination of a tank adapted to contain wash liquid, an endless filtering medium, a movable support for the filtering medium arranged to carry it along an endless path which is at one point substantially horizontal and which at other points extends through the tank below the level of the wash liquid contained therein, a substantially horizontal feed trough above the filtering medium and extending entirely across it at the said substantially horizontal part of its path, mechanism for successively opening and closing a series of openings in the bottom of the trough and extending from end to end thereof and for positively pushing material from the trough out through the said openings, means for regulating the said opening and closing mechanism to vary the maximum size of the openings, means for supplying ore pulp or other similar material to the trough, and a device for removing material from the surface of the filtering medium at points beyond the part of the path which extends through the wash liquid.

15. In a dehydrating and washing mechanism, the combination of a tank adapted to contain a wash liquid, a rotatable drum mounted in part within the tank to be partly submerged in the liquid therein, means for rotating the drum, a filtering medium mounted on the drum periphery, a device for feeding ore pulp or other similar material in a manner to permit the liquid constituent thereof to be drawn through the medium and the solid constitutents to be collected in a layer on the medium, a roller provided with a plurality of radial squeegee strips extending the entire length of the drum, means for supporting the roller in a position such that the strips thereof can contact with the drum, means for rotating the roller to cause the strips to move with respect to the filtering medium to loosen material therefrom, and means for receiving the material loosened from the filtering medium by the roller.

16. In a dehydrating and washing mechanism, the combination of a tank adapted to contain a wash liquid, a rotatable drum mounted in part within the tank to be partly submerged in the liquid therein, means for rotating the drum, a filtering medium mounted on the drum periphery, a device for feeding ore pulp or other similar material in a manner to permit the liquid constituent thereof to be drawn through the medium and the solid constituents to be collected in a layer on the medium, a cleaning device having a plurality of movable elements arranged to engage the filtering medium along lines extending from one end of the drum to the other, means for supporting the cleaning device above the drum at one side of the center, means for driving the cleaning device to cause the movable elements thereof to move toward the upper central part of the drum to loosen material from the filtering medium, and means for receiving from the drum the material loosened by the said cleaning device.

17. In a dehydrating and washing mechanism, the combination of a tank adapted to contain a wash liquid, a rotatable drum mounted in part within the tank to be partly submerged in the liquid therein, means for rotating the drum, a filtering medium mounted on the drum periphery, a device for feeding ore pulp or other similar material in a manner to permit the liquid constituent thereof to be drawn through the medium and the solid constituents to be collected in a layer on the medium, a cleaning device having a plurality of movable elements arranged to engage the filtering medium along lines extending from one end of the drum to the other, means for supporting the cleaning device to cause the movable elements thereof to move toward the upper central part of the drum to loosen material from the filtering medium, means for delivering liquid to the drum at the side of the cleaning device which is toward the upper central part of the drum, and means for receiving from the drum the material loosened by the cleaning device and mixed with the liquid discharged from the said liquid supply means.

18. In a dehydrating and washing mechanism, the combination of a tank adapted to contain a wash liquid, a rotatable drum mounted in part within the tank to be partly submerged in the liquid therein, means for rotating the drum, a filtering medium mounted on the drum periphery, a device for feeding ore pulp or other similar material in a manner to permit the liquid constituent thereof to be drawn through the medium and the solid constituents to be collected in a layer on the medium, a cleaning device having a plurality of movable elements arranged to engage the filtering medium along lines extending from one end of the drum to the other, means for supporting the cleaning device above the drum at one side of the center and at an angle to the drum axis, means for driving the cleaning device to cause the movable elements thereof to move toward the upper central part of the drum to loosen material from the filtering medium, means for supplying liquid to the drum at the side of the cleaning device which is toward the upper central part of the drum and a receptacle adjacent the lower end of the cleaning device to receive the mixture of liquid and of solid matter loosened by the cleaning device as the said mixture is worked by the cleaning device toward one side of the drum.

19. In a dehydrating and washing mechanism, the combination of a tank adapted to contain a wash liquid, a rotatable drum mounted in part within the tank to be partly submerged in the liquid therein, means for rotating the drum, a filtering medium mounted on the drum periphery, means connected with the filtering medium for maintaining a partial vacuum at its inner side, a device for feeding ore pulp or other similar material in a manner to permit the liquid constituent thereof to be drawn through the medium and the solid constituents to be collected in a layer on the medium, a roller provided with a plurality of radial squeegee strips, means for supporting the roller above the drum at one side of the center and at an angle to the drum axis, the roller being in position for the squeegee strips thereof to engage the filtering medium at the surface of the drum, means for rotating the roller to move the lower side thereof toward the upper central part of the drum to loosen material from the filtering medium, and a receptacle adjacent the lower end of the roller for receiving the material loosened from the filtering medium by the roller and by it moved along to one side of the drum.

20. In a dehydrating and washing mechanism, the combination of a tank adapted to contain a wash liquid, a rotatable drum mounted in part within the tank to be partly submerged in the liquid therein, means for rotating the drum, a filtering medium mounted on the drum periphery, means connected with the filtering medium for maintaining a partial vacuum at its inner side, a device for feeding ore pulp or other similar material in a manner to permit the liquid constituent thereof to be drawn through the medium and the solid constituents to be collected in a layer on the medium, a roller provided with a plurality of radial squeegee strips, means for supporting the roller above the drum at one side of the center and at an angle to the drum axis, the roller being in position for the squeegee strips thereof to engage filtering medium at the surface of the drum, means for rotating the roller to move the lower side thereof toward the upper central part of the drum to loosen material from the filtering medium, a perforated pipe parallel and adjacent the roller at the side thereof toward the upper central part of the drum, means for supplying wash liquid to the pipe which serves to deliver it to the filtering medium above the roller, and a receptacle adjacent the lower end of the roller to receive the mixture of wash liquid and solid matter loosened by the roller as the said mixture is worked by the roller toward one side of the drum.

21. In a dehydrating and washing mechanism, the combination of a tank adapted to contain a wash liquid, a rotatable drum mounted in part within the tank to be partly submerged in the liquid therein, means for rotating the drum, a filtering medium mounted on the drum periphery, means connected with the filtering medium for maintaining a partial vacuum at its inner side, a device for feeding ore pulp or other similar material in a manner to permit the liquid constituent thereof to be drawn through the medium and the solid constituents to be collected in a layer on the medium, a roller provided with a plurality of radial squeegee strips, means adjustable toward and away from the drum axis for resiliently supporting the roller above the drum at one side of the center and at an angle to the drum axis, the roller being in position for the squeegee strips thereof to engage filtering medium at the surface of the drum, means for rotating the roller to move the lower side thereof toward the upper central part of the drum to loosen material from the filtering medium, and a receptacle adjacent the lower end of the roller to receive the material loosened from the filtering medium by the roller and by it worked along to one side of the drum.

22. In a dehydrating and washing mechanism, the combination of a tank adapted to contain a wash liquid, a rotatable drum mounted in part within the tank to be partly submerged in the liquid therein, means for rotating the drum, a filtering medium mounted on the drum periphery, means connected with the filtering medium for maintaining a partial vacuum at its inner side, a device for feeding ore pulp or other similar material in a manner to permit the liquid constituent thereof to be drawn through the medium and the solid constituents to be collected in a layer on the medium, a roller provided with a plurality of radial squeegee strips, movable means for supporting the roller above the drum at one side of the center and at any one of a plurality of angles relative to the drum axis, the roller being in position for the squeegee strips thereof to engage filtering medium at the surface of the drum, means for rotating the roller to move the lower side thereof toward the upper central part of the drum to loosen material from the filtering medium, and a receptacle adjacent the lower end of the roller for receiving the material loosened from the filtering medium by the roller and by it moved along to one side of the drum.

23. In a dehydrating and washing mechanism, the combination of a tank adapted to contain a wash liquid, a rotatable drum mounted in part within the tank to be partly submerged in the liquid therein, means for rotating the drum, a filtering medium mounted on the drum periphery, means connected with the filtering medium for maintaining a partial vacuum at its inner side, a device for feeding ore pulp or other similar material in a manner to permit the liquid constituent thereof to be drawn through the medium and the solid constituents to be collected in a layer on the medium, a roller provided with a plurality of radial squeegee strips, movable means for supporting the roller above the drum at one side of the center and at any one of a plurality of angles relative to the drum axis, the roller being in position for the squeegee strips thereof to engage filtering medium at the surface of the drum, means for rotating the roller to move the lower side thereof toward the upper central part of the drum to loosen material from the filtering medium, a perforated pipe parallel and adjacent the roller at the side thereof toward the upper central part of the drum, the pipe being mounted on the roller supports to move therewith, means for supplying wash liquid to the pipe which serves to deliver it to the filtering medium above the roller, and a receptacle adjacent the lower end of the roller for receiving the mixture of solid matter loosened by the roller and the wash liquid as the said mixture is moved by the roller toward one side of the drum.

In testimony whereof, I affix my signature, in presence of two witnesses.

CYRUS ROBINSON.

Witnesses:
FRED H. GUYANT,
W. ARCOS.